Jan. 7, 1930.  J. H. P. ANDREWS  1,742,890
ROTARY PUMP
Filed May 15, 1928
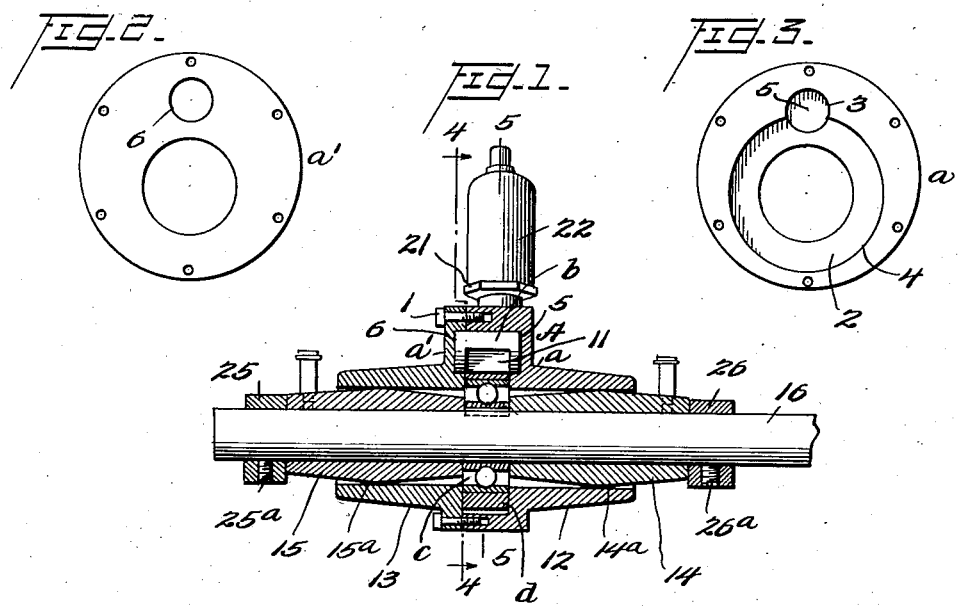
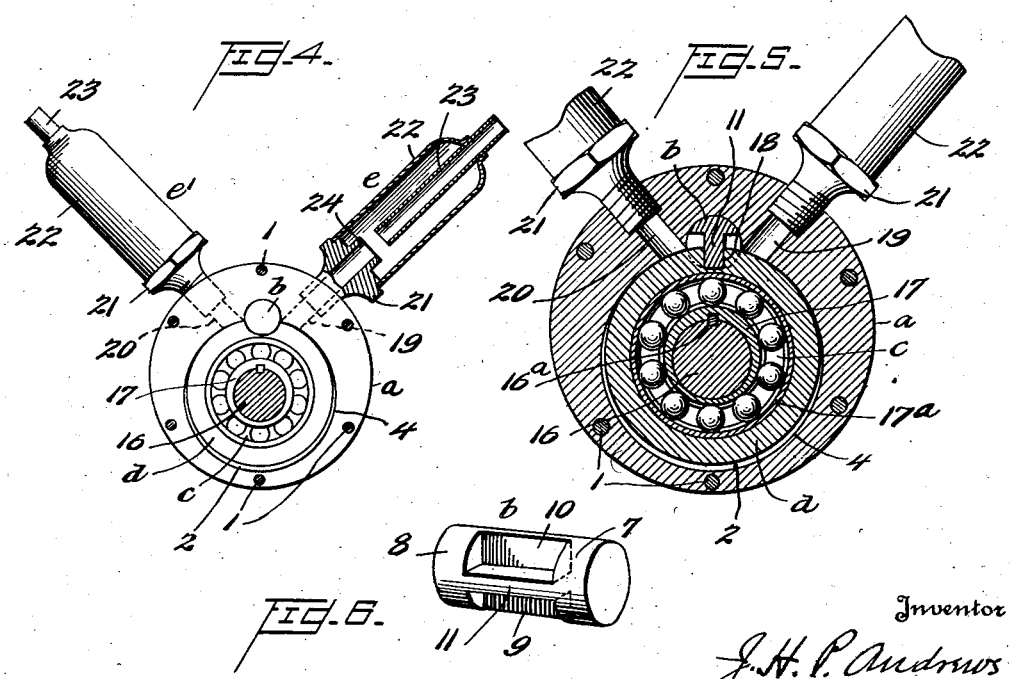
Inventor
J. H. P. Andrews
By Robert Watson
Attorney Patented Jan. 7, 1930

1,742,890

UNITED STATES PATENT OFFICE

JOHN H. P. ANDREWS, OF BALTIMORE, MARYLAND, ASSIGNOR TO HARRY D. HARVEY, OF BALTIMORE, MARYLAND

ROTARY PUMP

Application filed May 15, 1928. Serial No. 277,942.

This invention relates to a pump of the type having an annular piston which is given a planetary movement and which engages a pivoted abutment arranged between the inlet and outlet ports of the pump.

The present improvements include a novel form and arrangement of the abutment whereby the piston engages the abutment close to the pivotal axis of the latter, and a close fitting joint is maintained between the piston and abutment, with a minimum amount of wear between the parts. The invention also comprises an arrangement of the bearings for the piston shaft whereby said bearings are self-alining, and it also comprises means, external to the pump cylinder, for counterbalancing the piston, and means for preventing liquid from accumulating in the air chambers of the pump.

The details of the invention will be clear from the following specification, taken in connection with the accompanying drawing, in which, Fig. 1 is a central vertical section through the pump, taken on the line of the shaft;

Fig. 2 is an inner side elevation of one of the parts composing the pump cylinder;

Fig. 3 is a similar view of the other part of the pump cylinder;

Fig. 4 is a section on the line 4—4 of Fig. 1, the abutment being shown in end view and one of the air chambers being shown in central section;

Fig. 5 is a section on the line 5—5 of Fig. 1; and,

Fig. 6 is perspective view of the abutment.

Referring to the drawing, A indicates the pump cylinder which is composed of the two members $a$ and $a'$, held together by screws 1. The member $a$ has a cavity 2, which constitutes the interior of the cylinder, and the member $a'$ closes one side of the cavity and forms a side wall of the cylinder. The part $a$ has a transverse bore 3, which is intersected by the peripheral wall 4 of the cylinder on a line passing near the axis of said bore. The bore extends into the body of the part $a$ beyond the wall of the cylinder, forming a socket 5, and the part $a'$ has a similar socket 6 in line with the bore 3. A cylindrical abutment member $b$ fits within the bore, its end portions, 7 and 8, fitting into said sockets. The central portion of the abutment member is recessed, as shown at 9 and 10, to form a radial abutment 11, having flat parallel sides, the length of the abutment being equal to the width of the cylinder.

On the outer sides of the parts $a$ and $a'$ are integral sleeves 12 and 13, in which are arranged bearings 14 and 15, respectively, for a shaft 16. The outer surface of each bearing tapers oppositely, as shown, so that the bearing 14 engages the sleeve 12 only along the line 14$^a$ where the oppositely tapering parts of the bearing meet. Similarly, the bearing 15 engages the sleeve 13 only along the line 15$^a$ where the oppositely tapering surfaces of said bearing meet. These bearings are driven into the sleeves and held frictionally therein. It will be seen that owing to the tapering forms of the bearings and their narrow lines of contact with the sleeves, the bearings will be self-alining. The bearings also close the sleeves and prevent the escape of fluid from the cylinder.

A ball bearing $c$ is mounted upon the shaft. This bearing comprises an inner raceway 17 which is secured to the shaft by a key 16$^a$, and this raceway is eccentrically mounted upon the shaft, as shown. The outer raceway 17$^a$ is concentric with the outer surface of the inner raceway and said outer raceway fits tightly within an annular piston $d$, the diameter of which is somewhat less than the diameter of the cylinder. The piston has a radial slot 18 and the abutment 11 fits closely within said slot.

The part $a$ of the cylinder is provided with passageways 19 and 20, at opposite sides of the abutment member and close to said member, these passageways constituting ports. Air chambers $e$ and $e'$, both alike, are provided with nipples 21, which are threaded into these passageways. Each chamber comprises an outer casing 22, which fits airtight against the nipple, and a pipe 23 extends through the outer end of the casing and close to the end 24 of the nipple which projects into the casing.

The pump is adapted to operate at high speed, by direct connection of its shaft to a motor, and, in order to conveniently balance the piston, eccentric collars 25 and 26 are arranged upon the shaft at the ends of the bearings. These collars, which also serve to prevent endwise movement of the shaft in the bearings, are adjustable about the shaft and may be secured in any position of adjustment by set screws 25ª and 26ª. As these collars are external to the pump, it will be evident that balancing of the pump piston can readily be made after the pump has been set up, by adjusting the collars.

In operation, the pump shaft may be rotated in either direction by a suitable motor. As the shaft rotates, the piston describes a planetary movement about the axis of the shaft, and approximately a line contact is maintained between the periphery of the piston and the peripheral wall of the cylinder throughout the revolution of the shaft. This causes liquid to be drawn into the cylinder through one of the air chambers and the liquid is expelled from the cylinder through the other one of said chambers. As the pivotal axis of the abutment member is close to the peripheral wall of the cylinder, the abutment projects into the cylinder and the parts of the piston engaging the abutment slide on the abutment close up to the pivotal axis of the latter. The abutment has only a slight rocking movement, and as the piston is only slightly smaller than the diameter of the cylinder the sliding movement of the piston on the abutment is also relatively short. By the arrangement described, the walls of the slot make a close fitting joint with the abutment and one which is not subject to much wear.

The air chambers on pumps are usually constructed with the inlet and outlet for liquid at or near the same end of the chamber. Such air chambers are liable to become filled with the liquid. In the present invention, the liquid issuing from the nipple at the inner end of an air chamber is ejected from the nipple into the tube 23, from whence it passes away from the pump. With this arrangement, any excess of liquid accumulating in the chamber will be carried out by this ejector action and the chamber will be prevented from filling up with liquid.

What I claim is:

1. In a rotary pump, a cylinder having heads and having a transverse bore extending into said heads and forming bearings therein, the inner peripheral wall of the cylinder intersecting said bore, said cylinder having inlet and outlet ports at opposite sides of said bore, a cylindrical abutment member fitting within said bore and extending into said bearings, the parts of said member between the heads being recessed to form a radial abutment, a shaft journaled in the heads and extending axially through the cylinder, and an annular piston journaled eccentrically on the shaft and having a notch in its peripheral wall fitting closely against the sides of said abutment.

2. In a rotary pump, a cylinder having heads and having a transverse bore extending into said heads and forming bearings therein, the inner peripheral wall of the cylinder intersecting said bore on a line passing approximately through the axis of the latter, said cylinder having inlet and outlet ports at opposite sides of said bore, a cylindrical abutment member fitting within said bore and extending into said bearings, the part of said member between the heads being recessed to form a radial abutment, a shaft journaled in the heads and extending axially through the cylinder and an annular piston journaled eccentrically on the shaft and having a notch in its peripheral wall fitting closely against the sides of said abutment.

In testimony whereof I hereunto affix my signature.

JOHN H. P. ANDREWS.